Jan. 20, 1942.     H. F. MORLEY ET AL     2,270,599
SPEED INDICATOR FOR MOTOR VEHICLES

Filed May 6, 1939     3 Sheets-Sheet 1

INVENTORS,
Herbert F. Morley,
Roy E. Gearhart.
BY Hovey & Hamilton,
ATTORNEYS.

Jan. 20, 1942.   H. F. MORLEY ET AL   2,270,599
SPEED INDICATOR FOR MOTOR VEHICLES
Filed May 6, 1939   3 Sheets-Sheet 2

INVENTORS,
Herbert F. Morley,
Roy E. Gearhart.
BY Hovey & Hamilton.
ATTORNEYS.

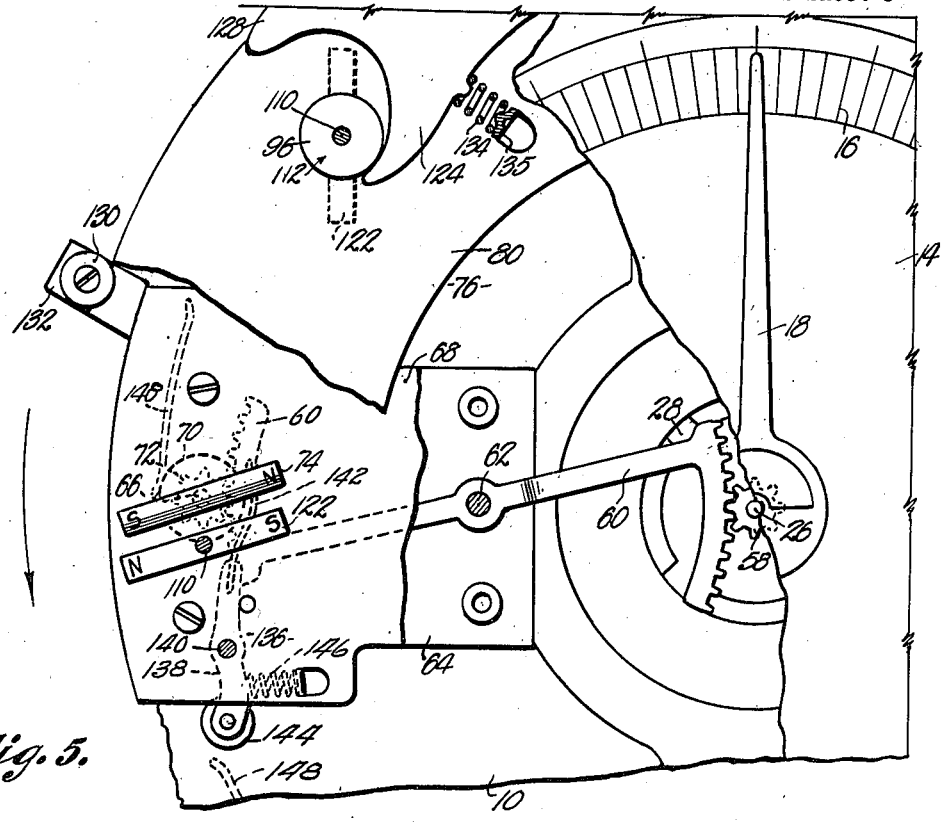

Patented Jan. 20, 1942

2,270,599

UNITED STATES PATENT OFFICE 2,270,599

SPEED INDICATOR FOR MOTOR VEHICLES

Herbert F. Morley and Roy E. Gearhart, Kansas City, Mo.; said Gearhart assignor to said Morley Application May 6, 1939, Serial No. 272,252

7 Claims. (Cl. 264—1)

This invention relates to a speed indicating device and particularly to a speed indicating device whereby the ground speed of an automobile is indicated for a predetermined distance last traveled.

In many instances it is desirable to have a visual indication of the speed traveled during a predetermined distance prior to the reading. This has been previously accomplished by means of a speed recorder wherein a visual record of the speeds has been made on a moving tape, which must be serviced when the tape has been exhausted. In order to overcome the objectional servicing of the device, applicants have invented a speed indicator wherein the parts are operable to constantly provide a visible indication of the rate of speed at which the last predetermined unit distance was traveled.

The principal object of this invention is the provision of a speed indicator in combination with a magnetic speedometer, having a magnet rotor shaft and a drag element shaft whereby a series of circumferentially disposed indicating members is rotated by said magnet rotor shaft, and means driven by said drag element shaft whereby each of said indicating members is set at each revolution of the series to indicate the respective current speeds of the automobile.

A further object of the present invention is the provision of a speed indicator for motor vehicles wherein means responsive to the speed of the vehicle, sets successively the various speed indicators of a series, to indicate the rate of automobile speed at predetermined spaced apart distances.

Further objects are simplicity and ecconomy of construction, accuracy and ease of operation, and adaptability for use on the various types of motor vehicles.

With these, as well as other objects which will appear during the course of the specification in view, reference will now be had to the drawings wherein:

Fig. 5 is an enlarged fragmentary view of the means whereby the indicating members are set.

Fig. 6 is a view similar to that shown in Fig. 5 with the parts moved to a slightly different relative position; and, Fig. 7 is a fragmentary section taken on line VII—VII of Fig. 3.

Figure 1:
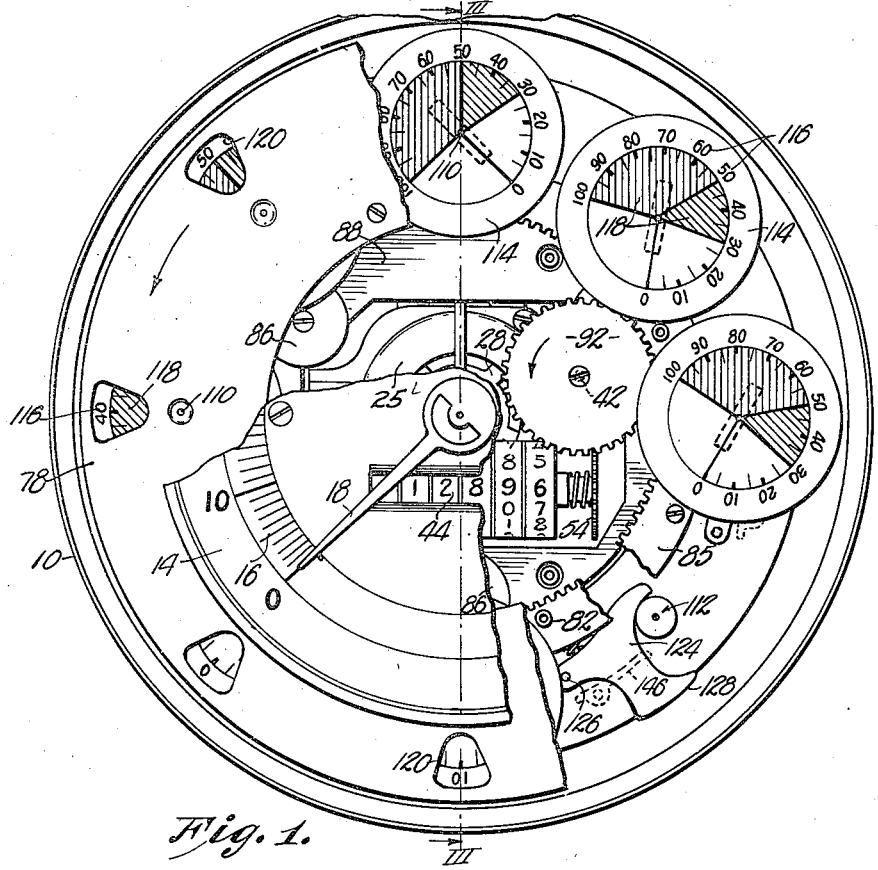
Figure 1 is a front elevation of an intermittent speed indicator for motor vehicles, partly broken away, embodying this invention.
Figure 2:
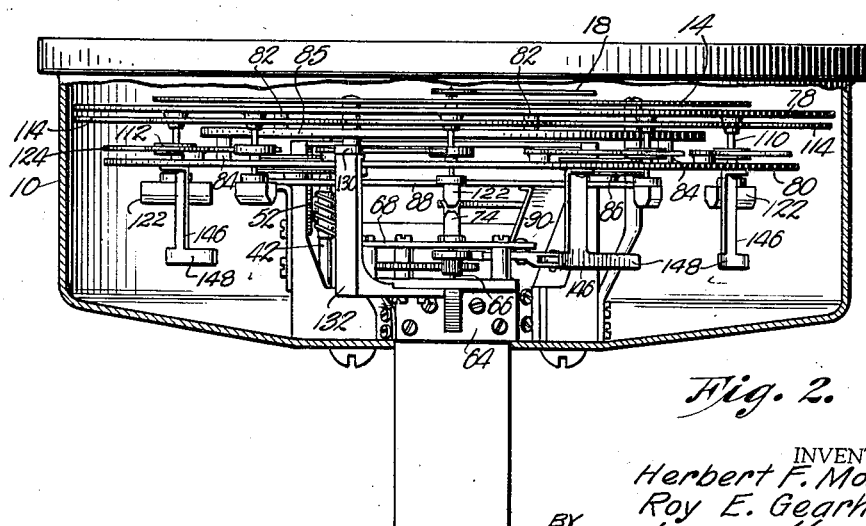
Fig. 2 is an elevation of the speed indicator, shown in Fig. 1, with the housing partly broken away.

Throughout the several views of the drawings, like reference characters designate similar parts and the numeral 10 is a housing provided with a transparent section 12, through which is visible a stationary dial 14 on which is inscribed a graduated scale 16 with which a movable indicator hand 18 is associated to indicate the ground speed of the automobile with which the device is associated.

This speed indicator is shown as used in combination with a magnet speedometer having a magnet rotor shaft 20 on which is mounted the magnet 22. Stationary field cup 25 is rigidly carried by the housing 10 and operates in the usual manner to facilitate the movement of drag cup 28. The outer end of shaft 20 is interconnected with a flexible shaft 24 which is driven by means (not shown) at a speed proportionate to the ground speed of the automobile. A secondary shaft 26 disposed co-axially with shaft 20 carries a drag member 28, which is so associated with the magnet 22 that as the magnet is rotated the drag member will be caused to oscillate against the action of spring 30. The amount of rotation of drag member 28 and shaft 26 is dependent upon the rate of rotation of the magnet so that by means of hand 18, secured to shaft 26, and the graduated scale 16, the speed of the automobile is indicated.

Figure 3:
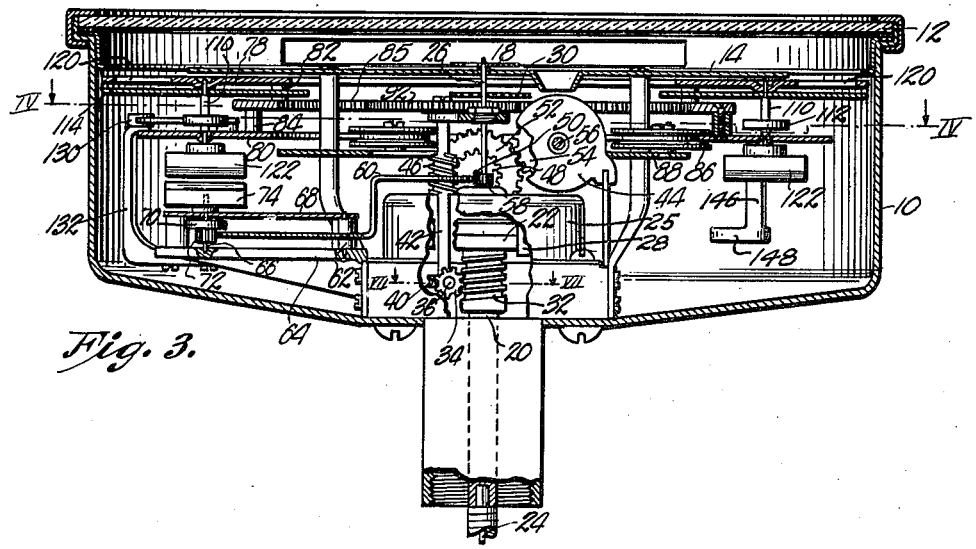
Fig. 3 is a central cross section taken on line III—III of Fig. 1, with some of the parts in elevation and some broken away.

Referring to Figs. 3 and 7, it will be noted that the shaft 20 is provided with a rigidly attached worm 32 which meshes with and drives a worm gear 34 mounted on the rotatably mounted shaft 36. This shaft 36 is also provided with a worm 38 which is in operative relation with worm gear 40 mounted on shaft 42 disposed in parallel relation to shaft 20. The cumulative milage indicator 44 is driven in the usual manner through worm 46 mounted on shaft 42, which drives spur gear 48 mounted on shaft 50. Gear 52 is driven by gear 48 and engages spur gear 54 to drive shaft 56 of the indicator 44.

All of the mechanism above described is old in the art and has been used in magnetic speedometers for many years.

The speed indicating mechanism of this invention is associated with the speedometer mechanism in the following manner:

Mounted on shaft 26 and rotatable therewith, is a spur pinion 58 which is adapted to mesh with and cause to oscillate, a double segmental gear member 60, pivoted at 62 to a stationary bracket 64 carried by housing 10. A shaft 66 mounted for rotation in bracket 64 and plate 68 is disposed in parallel relation to shaft 26 and has securely attached thereto and for rotation therewith, a brake drum 70 and a spur pinion 72. The one set of teeth of the segmental gear member meshes with the spur pinion 72 so that as the shaft 26 is oscillated as described above, shaft 66 will be operated to oscillate a permanent bar magnet 74 securely attached to the outer end portion of shaft 66.

A rotary ring assembly 76 comprising spaced apart ring discs 78 and 80, joined together by posts 82 and 84 which securely positions an internal gear 85 therebetween, is mounted coaxially with the shaft 26. A set of grooved wheels 86, mounted for rotation on a stationary disc 88 which is secured by bracket 90 to housing 10, engage the internal periphery of disc 80 to permit free and easy rotary movement of the ring assembly. A spur gear 92 mounted on the upper end of shaft 42 meshes with internal gear 85 to drive the ring assembly at a rate proportional to the rate of speed of the automobile.

Figure 4:
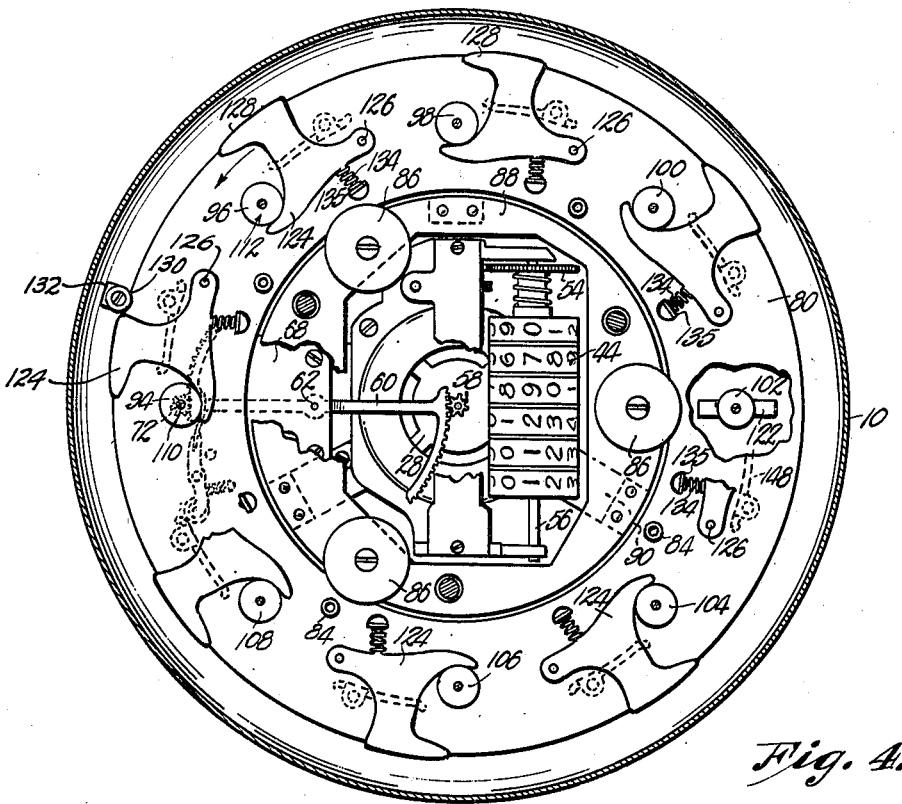
Fig. 4 is a cross section taken on line IV—IV of Fig. 3.

A series of speed indicating members 94, 96, 98, 100, 102, 104, 106, and 108 are arranged concentrically about shaft 26, as clearly shown in Fig. 4. Since these indicating members are similar in construction, but one will be described.

A shaft 110 is disposed in parallel relation with the axis of rotation of ring assembly 76, is rotatably mounted between ring discs 78 and 80, and is provided adjacent its center portion with a brake drum 112. An indicator disc 114 is mounted on the shaft 110 adjacent ring disc 82. The face of this indicator disc is provided with suitable indicia such as numeral 116, color sections 118, etc., to indicate the rate of speed of the automobile. When the indicator disc is oscillated as hereinafter described, the outer portion of the disc will move across a window 120 formed through the ring disc 82 (see Fig. 1).

The inner end of shaft 110 is provided with a rigidly attached permanent magnet 122, similar in length and size to magnet 74. Shafts 66 and 110 are in parallel relation and are adapted to be moved into axial alignment once during each revolution of the ring assembly. When these shafts are in axial alignment, magnets 74 and 122 are so positioned that they will be in magnetic, relative relation so that they will be moved to a relatively registering relation.

A brake member 124 pivoted at 126 to ring disc 80, has an outwardly projected shoe portion 128, which moves in a circular path to contact roller 130, mounted for rotation on the stationary support 132. This brake is urged against brake drum 112 by a compression spring 134 disposed between the brake member 124 and an abutment 135. At each revolution of the ring assembly, each of the brakes of the various speed indicators, is moved to the released position as the shoe 128 engages roller 130. The brake drum 70 is provided with a braking mechanism 136 comprising a bar 138 pivoted intermediate its ends at 140, having a resilient tongue 142 at its one end to engage the brake drum 70, and a roller 144 at its other end.

A spring 147 engages bar 138 to normally urge tongue 142 away from the brake drum 70. Roller 144 is in the path of travel of a series of cam members 148 carried by bracket 146 mounted on the rotary ring assembly, which successively engage the roller and cause tongue 142 to bear against brake drum 70.

In the drawings it will be noted that there is provided eight of the indicating members and that they are equally spaced in a circle, concentric with the axis of rotation of the ring assembly by which they are carried. This relation of the parts might be varied to include various distances between the adjacent speed indicators, also, they might be positioned out of a regular circular relation.

The operation of the speed indicator is as follows:

When the automobile is in motion, shaft 20 is rotated by means responsive to the speed of the automobile. Permanent magnet 22 is thus rotated to cause a partial rotation of drag member 28 and including shaft 26. Rotary ring assembly 76, carrying the speed indicating members, is simultaneously rotated at a speed proportionate to the ground speed of the automobile and makes one complete revolution in a predetermined distance of vehicle travel, so that the interval between adjacent indicating members will correspond to a predetermined distance of ground travel. In the present showing, the predetermined distance is two hundred and twenty feet, however, this distance could be easily varied by changing the gearing, spacing, etc. By this device, each of the indicating members is set to indicate the current speed of the car and retains that setting during its travel through substantially a full revolution of the ring assembly.

Referring now to Figs. 5 and 6 wherein is clearly shown the relation of the mechanism during the setting of the indicating members. In Fig. 5 indicating member 96 is shown secured in the set position by brake 124 through the action of spring 134. As indicating member 96 is moved to the position shown in Fig. 6, the shoe portion 128 of the brake member engages roller 130 to move the brake out of engagement with brake drum 112 to permit free oscillation of magnet 122. When the indicating member 96 is free to oscillate, as described above, magnet 74 is secured against movement, as clearly shown in Fig. 6, since roller 144 is riding on cam member 148 to cause the resilient tongue 142 to engage the brake drum.

Prior to the locking of drum 70, it was free to be moved by the rotation of spur pinion 58 through segmental gear member 60, and spur gear 72, thus insuring the positioning of the permanent magnet 74 to correspond with the indication of the current speed of the automobile. This magnet 74 is therefore, secured during the time that the magnet 122 is released and free to move to register with magnet 74 as the indicating member moves over said magnet.

When the permanent magnets are in register, and preferably when their axes are in alignment, as described above, the brake is released from drum 70, also the brake is set on drum 112. This securing of the parts insures a proper reading of the indicia through the openings or window 120 (see Fig. 1). By this means, it is apparent that each of the indicating members will be successively set at each revolution of the rotary ring assembly 76 to indicate the speed of the automobile at the time of each setting, thus making it possible to indicate the speed of the automobile for a predetermined distance last travelled by the vehicle.

By means of this speed indicating device, the speed of the car for a given distance, for instance one-half mile, just traveled, is indicated by the total showing of the series of indicating members; for example, the speed of the automobile at each successive two hundred and twenty feet will be indicated. As a new two hundred and twenty feet is added to the indication, the earliest indication shown, is canceled, thus insuring a continuous indication of the speed of the last half mile traveled.

Since the speed of the automobile may be accelerated slightly during the periods that the drum 70 is secured, it is an advantage to have magnet 122 secured just as it is leaving the indicating position with magnet 74 (see Fig. 5), since the magnetic pull will tend to stabilize magnet 74 and permit it to gradually move to the speed indicating position without objectionable jerking.

Another advantage of this structure is that there is no force exerted by magnet 122 as it is moved to register with magnet 74 through the means connecting with shaft 26 to cause it to fluctuate and disturb the reading of the speedometer.

It is very apparent that, as suggested above, this indicating device need not be associated with the present speedometer, but may constitute a complete unit within itself to be driven by means responsive to the ground speed of the motor vehicle.

It will be obvious that many changes may be made in the general arrangement and functioning of the parts without departing from the spirit of the invention, and it is our desire to be limited only by the scope of the appended claims.

Having thus described the invention, what is claimed as new and desired to be secured by Letters Patent is:

1. In a speed indicating device for motor vehicles, the combination with a magnetic drag unit responsive to the speed of the vehicle; a rotatably mounted series of speed indicating elements driven by means driven in direct proportion to the ground speed of the vehicle; and magnetic means controlled by said speed responsive means to successively set said indicating elements as they are rotated to indicate the then current speed of the vehicle, whereby an indication of the speed at the beginning of the last unit distance traveled is made.

2. In a speed indicating device for motor vehicles, the combination with magnetic means responsive to the speed of the vehicle; a rotatably mounted series of speed indicating elements adapted to be driven at a speed proportionate to the speed of the vehicle; magnetic means controlled by said speed responsive means to successively set the indicating elements to indicate the then current speed of the vehicle; and means for securing said indicating elements in the set position.

3. In a speed indicating means for motor vehicles the combination with a magnetic speedometer responsive to the ground speed of the vehicle and having a magnet rotor shaft and a drag element shaft; a series of circumferentially disposed speed indicating members driven by said rotor shaft to rotate said series of indicating members, and means operated by said drag element shaft to successively set each of the series of speed indicating members to indicate the then current speed of the vehicle at each revolution of said series.

4. In a speed indicating device for motor vehicles the combination with a magnetic speedometer for determining the ground speed of automobiles, having magnet rotor shaft and a drag element shaft, a series of circumferentially disposed speed indicating discs, means driven by said rotor shaft whereby said series of speed indicating members is rotated in one direction at a speed proportionate to the speed of the automobile, and means operated by said drag element shaft whereby said indicating members are successively rotated to a position to indicate the then current speed of the automobile as the series of indicating members is rotated.

5. In a speed indicating tachometer for motor vehicles comprising a primary shaft driven at a speed proportionate to the speed of the automobile, a series of speed indicating members adapted to be rotated by said driven shaft about a common axis, a secondary shaft adapted to be moved through predetermined arcs by means magnetically associated with said primary shaft to indicate the current speed of travel of the primary shaft, and means operated by said secondary shaft whereby said indicating members are successively set to indicate the current speed of the automobile at the beginning of the last unit distance traveled.

6. A speed indicating tachometer for motor vehicles comprising a primary shaft driven at a speed proportionate to the speed of the automobile, a series of speed indicating discs adapted to be driven by said driven shaft about a common axis, a secondary shaft adapted to be moved through predetermined arcs by magnetic means associated with said primary shaft to indicate the current speed of travel of the primary shaft, means operated by said secondary shaft to rotate said indicating discs successively to indicate the then current speed of the automobile, and means for securing said indicating discs in the set position through the major portion of each revolution of said series of discs.

7. In a speed indicating device for motor vehicles, the combination with magnetic means responsive to the speed of the vehicle; a rotatably mounted series of speed indicating elements adapted to be driven at a speed proportionate to the speed of the vehicle; magnetic means controlled by said speed responsive means to successively set the indicating elements to indicate the then current speed of the vehicle; means for securing said indicating elements in the set position, and automatic means to make inoperative said securing means just prior to the setting of said indicating elements.

HERBERT F. MORLEY.
ROY E. GEARHART.